(12) United States Patent
Marriott et al.

(10) Patent No.: US 6,371,510 B1
(45) Date of Patent: Apr. 16, 2002

(54) AIR BAG MODULE WITH INTERNAL DEPLOYMENT FLAP

(75) Inventors: Brandon S. Marriott, West Bloomfield; Nathan A. Schimmoller, Troy; Steven C. Bell, Rochester Hills, all of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/350,345

(22) Filed: Jul. 9, 1999

(51) Int. Cl.[7] .............................................. B60R 31/22
(52) U.S. Cl. ..................... 280/730.1; 280/731; 280/733
(58) Field of Search .......................... 280/743.1, 743.2, 280/729, 731, 730.1, 733, 736, 742, 728.1, 728.2

(56) References Cited

U.S. PATENT DOCUMENTS

| | | | | |
|---|---|---|---|---|
| 3,907,327 A | * | 9/1975 | Pech | 280/729 |
| 3,970,328 A | * | 7/1976 | Wallsten | 280/731 |
| 4,300,894 A | * | 11/1981 | Cumming et al. | 280/729 X |
| 5,004,266 A | * | 4/1991 | Miller et al. | 280/743.1 |
| 5,398,958 A | * | 3/1995 | Taggert | 280/743.2 X |
| 5,498,030 A | * | 3/1996 | Hill et al. | 280/743.1 |
| 5,533,755 A | * | 7/1996 | Nelsen et al. | 280/743.1 |
| 5,560,648 A | * | 10/1996 | Rhule et al. | 280/731 |
| 5,618,595 A | * | 4/1997 | Matsushima et al. | 280/743.2 X |
| 5,630,614 A | * | 5/1997 | Conlee et al. | 280/731 X |
| 5,727,812 A | * | 3/1998 | Dykstra et al. | 280/731 |
| 5,746,446 A | * | 5/1998 | Breed et al. | 280/743.1 |
| 5,810,390 A | * | 9/1998 | Enders et al. | 280/743.1 X |
| 6,070,904 A | * | 6/2000 | Ozaki et al. | 280/743.1 |
| 6,149,188 A | * | 11/2000 | Simpson et al. | 280/731 |

* cited by examiner

Primary Examiner—Brian L. Johnson
(74) Attorney, Agent, or Firm—Markell Seitzman

(57) ABSTRACT

A vehicle occupant safety device (20) comprising: an air bag (70) initially in a folded configuration and when inflated by inflation gases expands to an inflated configuration to protect the occupant; an inflator (50) for providing inflation gases to inflate the air bag; a shroud (80) comprising a plurality of frangible straps, preferably loosely positioned about the exterior of the folded air bag for controlling the trajectory of the inflating air bag by initially restricting the forward extension of the air bag by interaction with the shroud (80) and thereafter directing the air bag to inflate along a passageway defined by the shroud which is oriented at a downward angle relative to the occupant. Once the air bag exits the shroud it is free to inflate laterally and upwardly to protect the occupant. In one embodiment the shroud includes a tearable strap (140).

14 Claims, 14 Drawing Sheets

AIR BAG MODULE WITH INTERNAL DEPLOYMENT FLAP

BACKGROUND AND SUMMARY OF THE INVENTION

This invention generally relates to motor vehicle air bags. More particularly, the invention relates to an air bag module having a shroud that influences the deployment characteristics of the air bag to reduce the risk of injury to an out-of-position occupant.

Many air bag systems are designed to protect a 50$^{th}$ percentile, unbelted male occupant in a 48 Kph (30 mph) crash. As the air bag is designed to protect the occupant during a relatively severe crash the air bag must be inflated at a relatively aggressive rate. This rate of inflation may not be optimum for a smaller sized occupant and/or one seated close (out-of-position) to the location of the air bag. Recently, a new type of air bag system has been proposed (a smart system) that uses a multi-stage inflator, as well as occupant and crash sensors. In these smart systems the rate of inflation is varied in accordance with parameters which include occupant size, crash conditions, seating position, etc. As can be appreciated these smart systems are costly, unfortunately not in production and complicated.

Further, in many prior art systems, the air bag is designed to deploy from the module directly at the chest of the occupant. This type of deployment characteristic may result in high chest and neck forces being exerted on these body areas.

It is an object of the present invention to provide an air bag that is usable in both a conventional and an advanced air bag system. A further object of the invention is to provide an air bag and air bag module which reduce the potential of injury for an out-of-position (OOP) occupant. An additional object of the present invention is to provide an air bag that protects the OOP occupant while not sacrificing protection for the 50$^{th}$ percentile male occupant. An additional object of the present invention is to maximize ease of manufacture while reducing overall cost (of the air bag and air bag module). A further object of the invention is to provide an air bag that impacts the occupant's torso at a downward angle lessening initial bag/occupant impact forces.

A conventional air bag module is typically mounted upon a motor vehicle's steering wheel or in the instrument panel of the vehicle. The typical module will most often include a mounting plate or housing that facilitates the mounting of the module to the adjacent portion of the vehicle and provides a reaction surface for deployment forces. The modules will also include a single or multi-level inflator that is mounted to the mounting plate, and an air bag located proximate the inflator to receive inflation gas. The air bag is protected by a cover that is forced open as the air bag inflates.

The prior art has shown internal deployment flaps, which utilize steel bands or stitched deployment sheets to redirect the energy of the deploying air bag when an out-of-position occupant is in close proximity to the air bag module (see U.S. Pat. Nos. 5,004,266 and 5,498,030).

Accordingly, the invention comprises: an air bag module and more particularly a shroud which envelops an air bag and is secured to portions of a mounting plate or housing. The air bag is inflated by an inflator and protected by a cover. In the preferred embodiment of the invention the shroud is made from a relatively flexible fabric and is situated about the air bag. The shroud limits the air bag's forward extension during the early stages of deployment. In one embodiment, the shroud includes an open end while in another embodiment the shroud has an enclosed end that is torn open.

The invention further includes a method for producing an air bag module assembly as well as a method of changing the kinematics of a cushion deploying from within the module when-an object of sufficient mass is near the module.

While a preferred embodiment of the module has been described in detail, it should be apparent that many modifications and variations hereto are possible, all of which fall within the true spirit and scope of the invention. Many objects and purposes of the invention shall be clear from the following detailed description of the drawings.

DETAILED DESCRIPTION OF THE DRAWINGS

Figure 1:
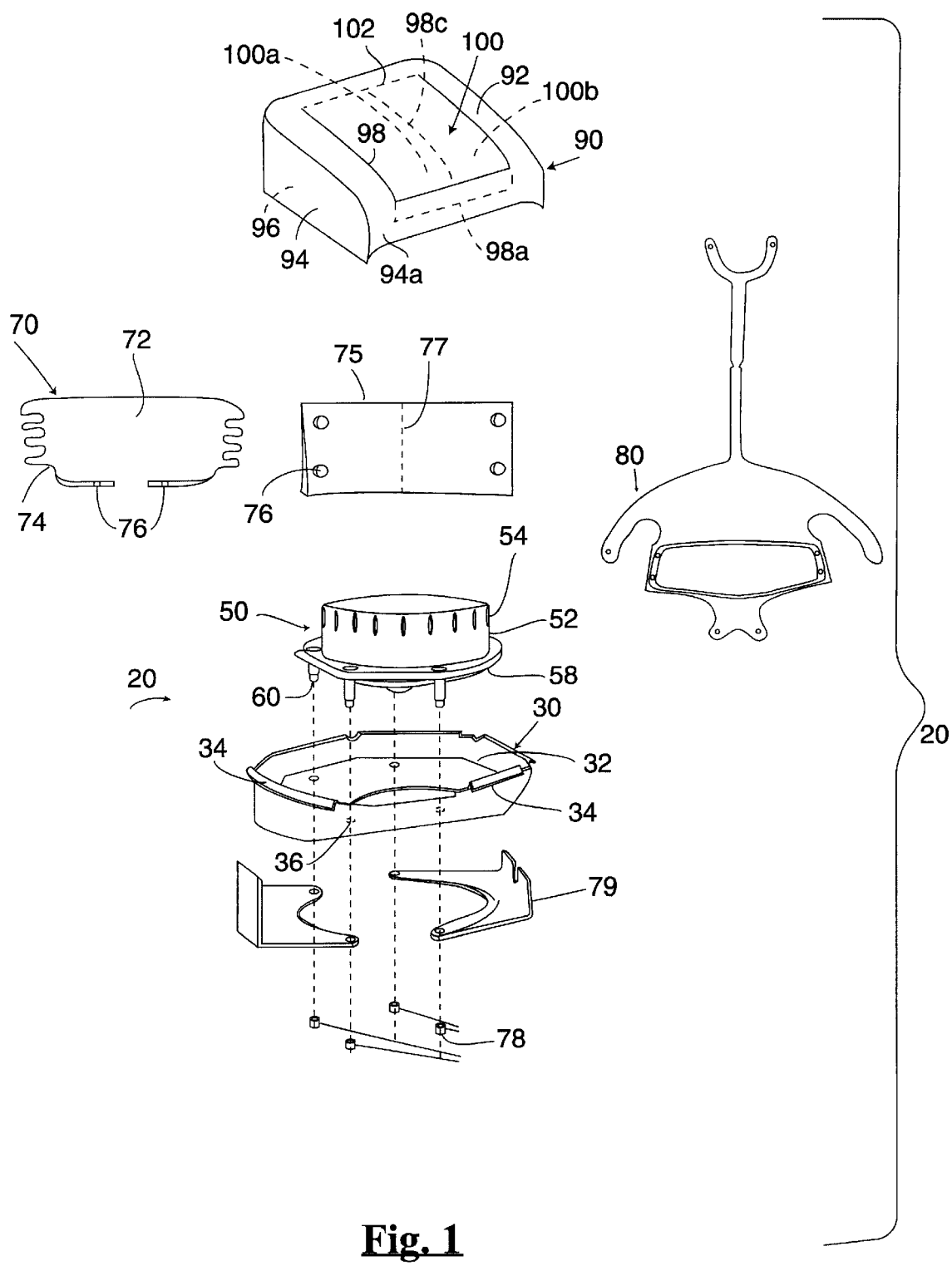
FIG. 1 is an exploded view of an air bag module constructed in accordance with this invention.

FIG. 1 shows the basic components of an air bag module 20 incorporating the present invention. The module includes an inflator housing 30, an inflator 50, an inflatable restraint, such as an air bag 70, a wrap 75, a shroud 80 and a deployment cover (or cover) 90. The exemplary inflator housing 30 includes a cup-shaped body 32, a plurality of radially extending flanges 34 and a plurality of bolt receiving openings 36. The inflator 50 comprises a cylindrically shaped body 52 having a plurality of gas flow ports 54 situated thereabout. A radial flange 58 extends about the body 52 and a plurality of threaded fasteners 60 extend therefrom. Each fastener 60 is received within a respective opening 36 of the housing 30. The air bag 70 includes an inflatable or cushion portion 72 and a neck 74 that includes a plurality of fastener openings 76. The inflator fasteners are passed through the openings 76 and 36 (in the housing). The neck is sandwiched between the inflator flange 58 and the housing 30. As is known in the art, the inflator flange 58 can be replaced by a separate mounting ring with studs. The inflator is secured to the housing 30 by a plurality of nuts 78 that are secured to a respective fastener 60. The housing may additionally include a bracket 79 to enable the housing to be secured to the steering wheel or instrument panel or such bracket can be a part of the vehicle. It should be appreciated that the housing 30 can be incorporated within and be an integral part of the steering wheel or other vehicle component. With regard to the inflator it can be a single level or multi-level inflator capable of delivering inflation gas to cause the air bag to inflate at one or more inflation rates.

The folded air bag is positioned about the inflator and located in the housing. The air bag can be prevented from unfolding by enveloping it with optional covering or wrap 75. The wrap also includes fastener openings 76. The wrap can be made of paper or other material and may include a perforated tear line 77 which is opened as the air bag inflates. The shroud 80 is also placed about the air bag. The shroud 80 may be placed about the wrap 75 or alternately the wrap can be placed about the shroud after the shroud is placed about the folded air bag.

Prior to inflation, the wrap 75 and/or shroud 80 keep the folds of the air bag from relaxing or expanding. With the air bag 70 and inflator 50 in place within the housing, the cover 90 is secured to the housing or steering wheel. The cover 90 may include, for example, a top 92 and depending sides 94 (including a front (side) 94a). As can be appreciated, the cover 90 defines an interior cavity 96. The cover 90 also includes a tear seam(s) 98 which when opened permits the air bag to continue to inflate. That portion of the cover 90 interior to the seam 98 is referred to as a door or deployment door 100. In the preferred embodiment of the invention the tear seam is three-sided and generally C-shaped and includes a hinge 102 toward the rear of the cover. The tear seam may lie solely on the top 92 of the cover or extend downwardly to and across the front side 94a. This downward extension of the tear seam is shown by numeral 98a. As the air bag inflates it bears against the inside surface of the door 100 tearing the seam 98 whereupon the door pivots rearwardly about the integrally formed hinge 102. In another embodiment the tear seam can be I-shaped with a center tear line or seam 98c. In this embodiment the tear seam permits the cover to split into a right and left-hand door segments (100a and 100b, shown by dotted lines) which pivot outwardly (to the right and left) as the air bag inflates. The use of the C-shaped and I-shaped tear seams lessens the probability that the structure of the cover will interfere with the air bag as it deploys.

As mentioned above, the cover is connected to the housing 30. This connection can be achieved in a number of ways presently used in the art. The mode of connection is not critical to the present invention and may include the use of fasteners such as rivets (not shown) to secure the cover to the housing or alternatively the cover can be designed to snap onto the housing. With regard to a snap-on type of connection, the cover will include a groove (not shown) on each or on portions of the depending sides 94. Each section of the flange(s) 34 of the housing is received within a respective groove or groove section to affect the snap-on connection therebetween. The fasteners and the groove/flange connection may be used to complement one another.

The inflator 50 may be a single or multi-level inflator, that is, it is capable of supplying inflation gas to inflate the air bag 80 at one or more selectable rates of inflation.

Figure 2:
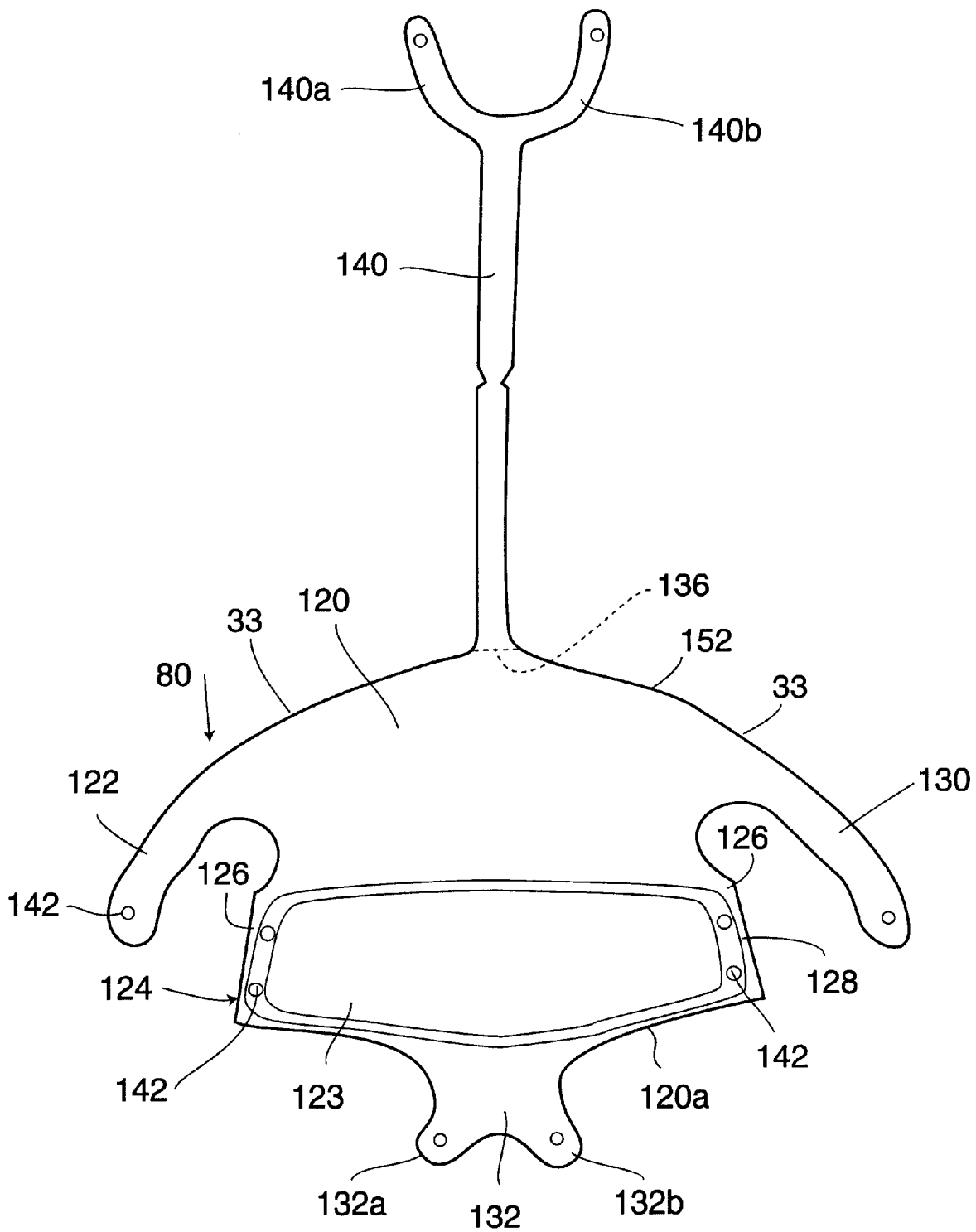
FIG. 2 shows a plan view of a shroud of the invention.
Figure 3:
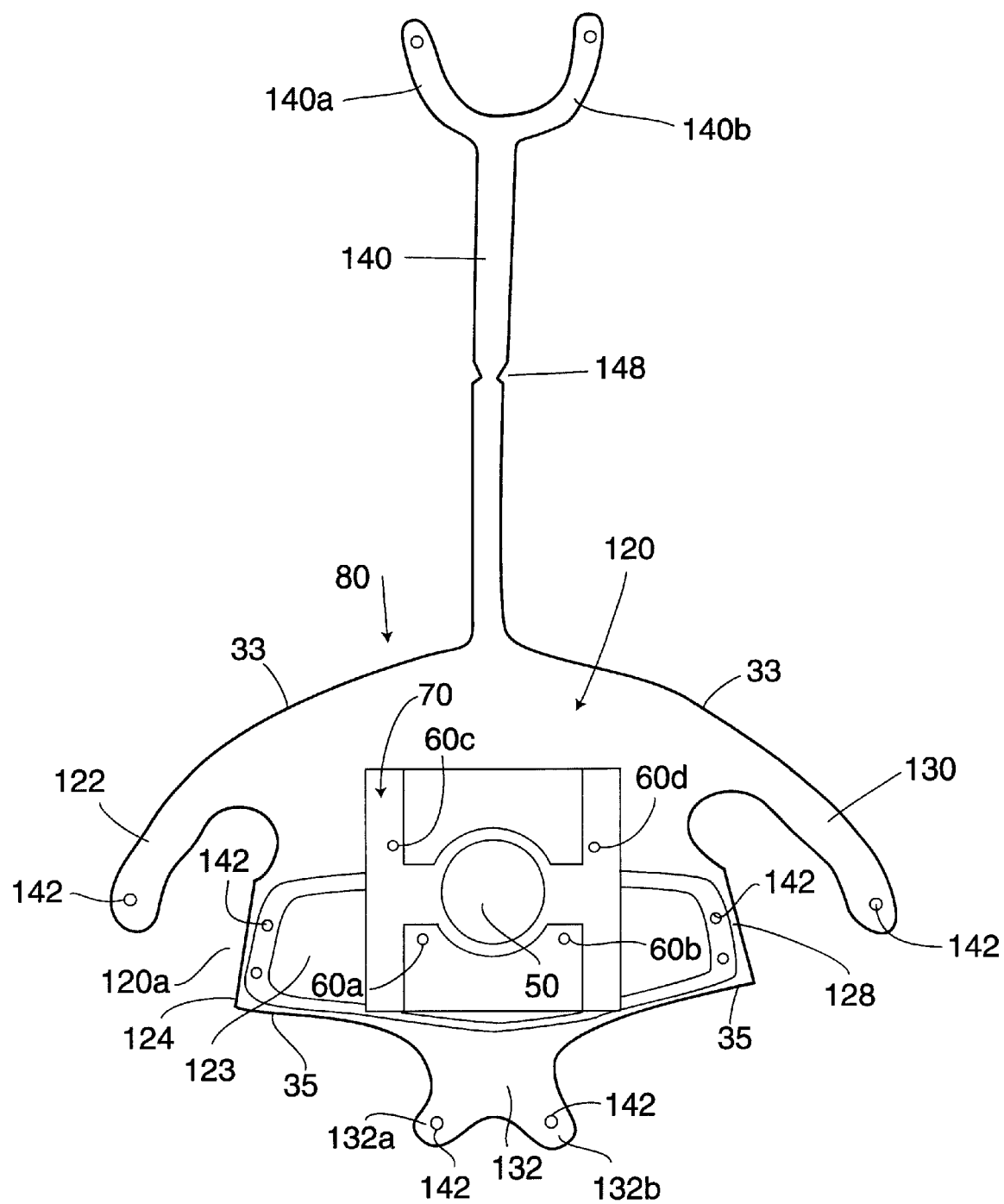
FIG. 3 shows the shroud of FIG. 2 with a folded air bag superimposed thereon.
Figure 4:
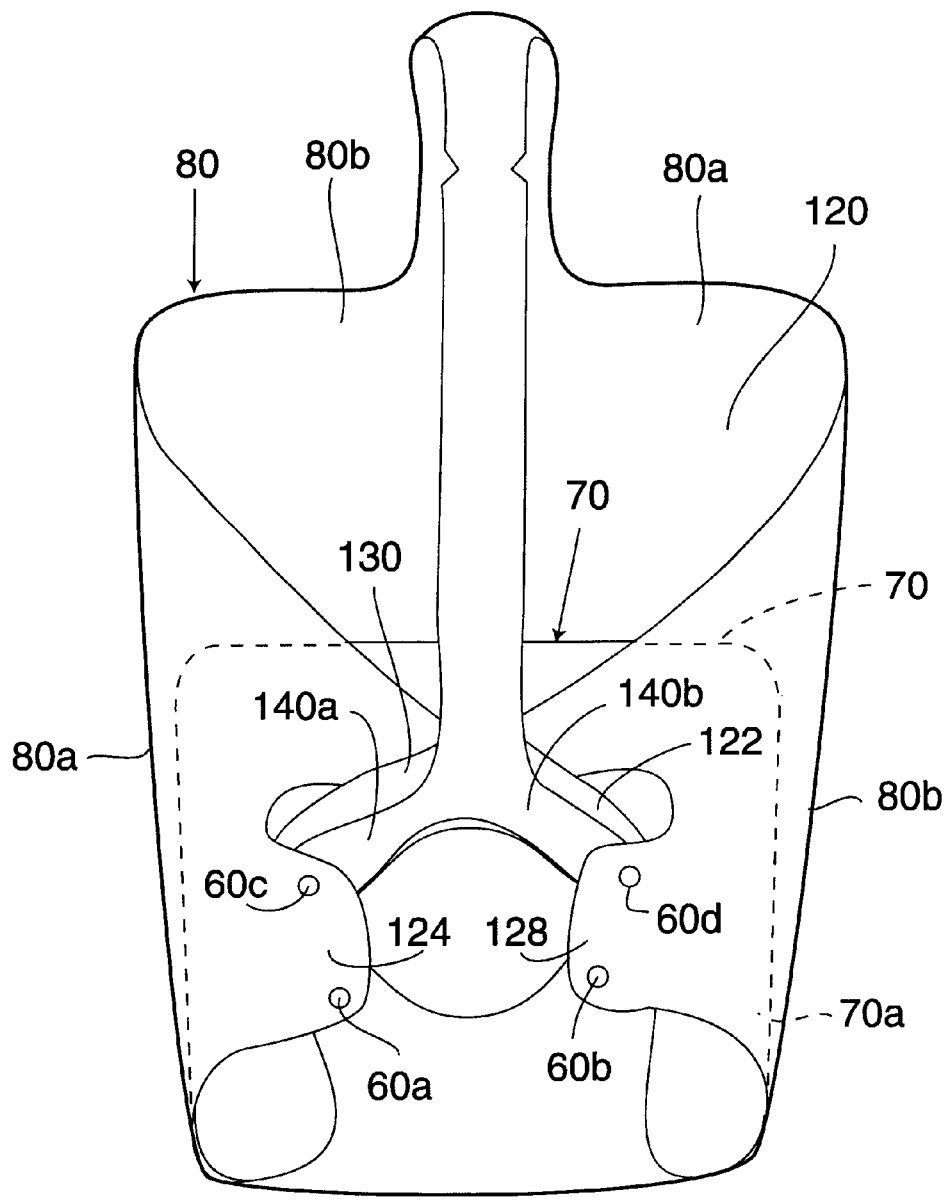
FIG. 4 is a bottom view of the shroud folded about the air bag.

Reference is made to FIGS. 2–4. FIG. 2 shows a plan view of one embodiment of a shroud 80 (which is shown laid on a flat surface for the purpose of illustration). The shroud comprises a main body 120 having a plurality of extending arms or straps 122 and 130, each of which includes one or more mounting holes 142. One preferred material for the shroud 80 is 630D 41×41 silicone coated, woven nylon fabric. A lower denier material such as 440D or 315D can also be used depending on the desired strength of the shroud. The lower portion 120a of the main body 120 is optionally reinforced by sewing an additional panel of material 123 thereto. For purposes of illustration a folded air bag 70 and inflator 50 are superimposed on the shroud 80 as shown in FIG. 3 to show the relative size thereon. As can be seen the body 120 of the shroud 80 is somewhat larger than the profile of the air bag folded and mounted to the inflator. The right and left ends of the lower portion 120a of the main body 120 define the additional arms or straps designated as 124 and 128. These arms or straps are relatively short and stubby. Both of these straps 124 and 128 include two mounting holes 142. A lower strap 132 also extends from the body 120. This strap 132 is divided into strap segments 132a and 132b. The shroud further includes an arm or strap 140 with ends 140a and 140b each with a mounting hole 142. If this strap is not used the shroud ends at dotted line 136.

Reference is briefly made to FIG. 4 which shows how the shroud 80 is secured about the folded air bag and to the fasteners 60a–d extending from the inflator 50. The air bag 70 is secured about the inflator and folded into a compact configuration forming a bag pack subassembly 70a. The assembly 70a is turned upside-down and laid on the shroud 80, with the air bag atop the shroud. Subsequently, the arm or strap 132 is pulled about the assembly and the legs 132a and 132b positioned so that fasteners 60a and 60b extend through a respective opening 126. Arms or straps 124 and 130 are respectively moved about the assembly 70a and secured to fasteners 60d and 60c. Thereafter strap 140 is folded over and positioned on the assembly 70a with ends 140a and 140b secured about fasteners 60c and 60d. Arms or straps 124 and 128 are subsequently folded about the air bag and secured about fasteners 60a, 60c and 60b, 60d.

Figure 5:
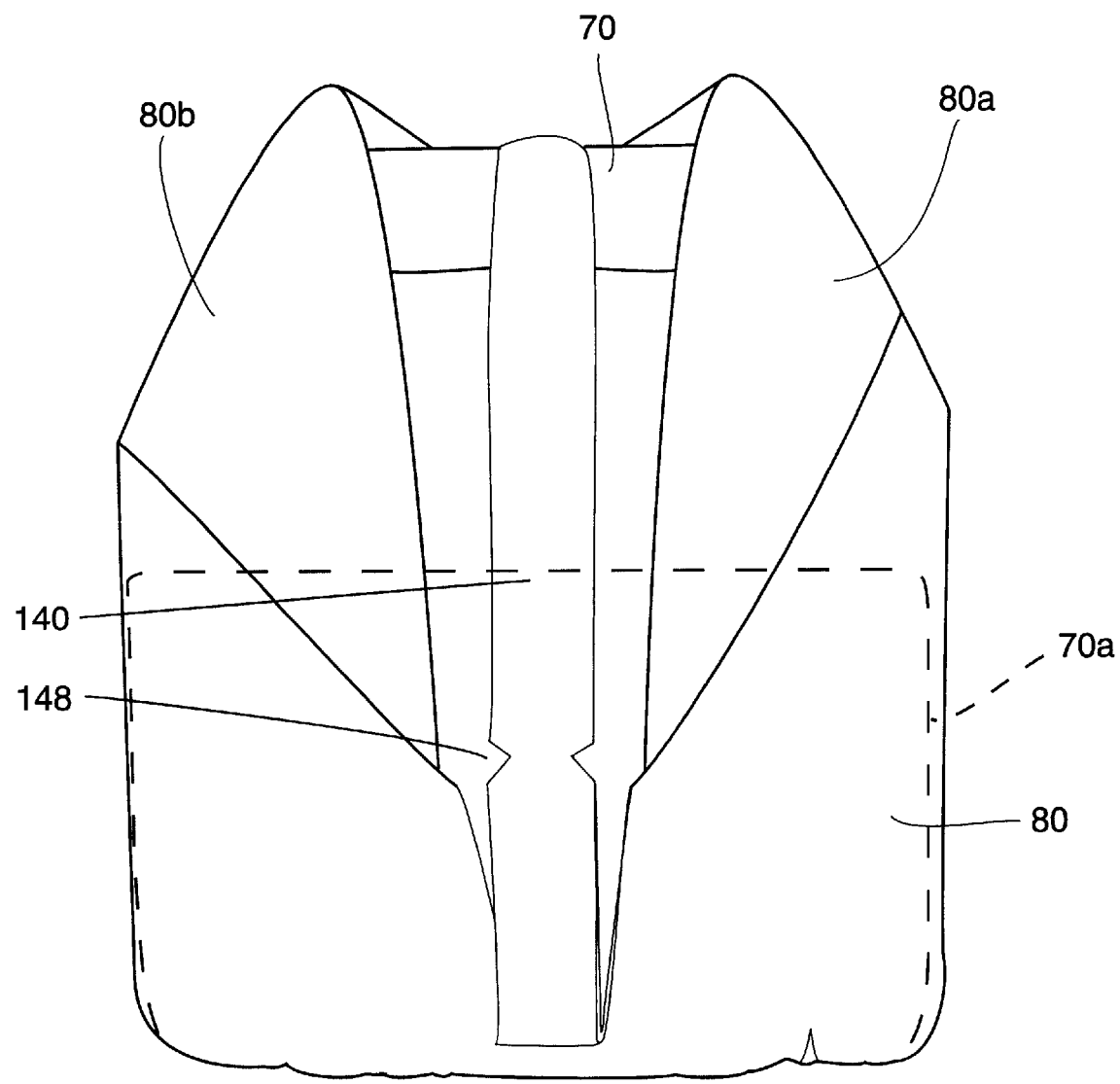
FIG. 5 is a top view of the assembly of FIG. 4.

Reference is made to FIG. 5 which is a top view of the bag pack sub-assembly 70a and the shroud 80. More particularly the orientation shown in FIG. 5 is achieved by flipping the air bag, inflator and shroud of FIG. 4 over onto its bottom and folding the strap 140 about itself and placing it upon the top of the shroud 80. Subsequently, the configuration of FIG. 5 is enveloped with the wrap 75 to maintain the air bag and shroud in the desired configuration. Though not shown in FIG. 5, the line of perforations 77, of the wrap 75, is located on the top of the shroud 80. It should be appreciated and as mentioned above, that the wrap 75 can be placed only about the folded air bag 70 with the shroud 80 positioned about the wrap 75. As can be appreciated, in this alternate embodiment the shroud, due to its oversized shape is loosely positioned about the air bag and wrap.

FIGS. 4 and 5 also show the relationship of the size of the main body 120 of the shroud to the size the folded air bag 70. In this configuration the shroud 80 extends substantially outward from the air bag 120. As is also apparent from FIG. 5, the shroud 80 is not tightly wrapped about the sides of the folded air bag. More specifically the sides 80a and 80b of the shroud 80 extend away from the air bag 70 at an angle providing the shroud with a generally trapezoidal configuration, when laid flat.

Figure 8:
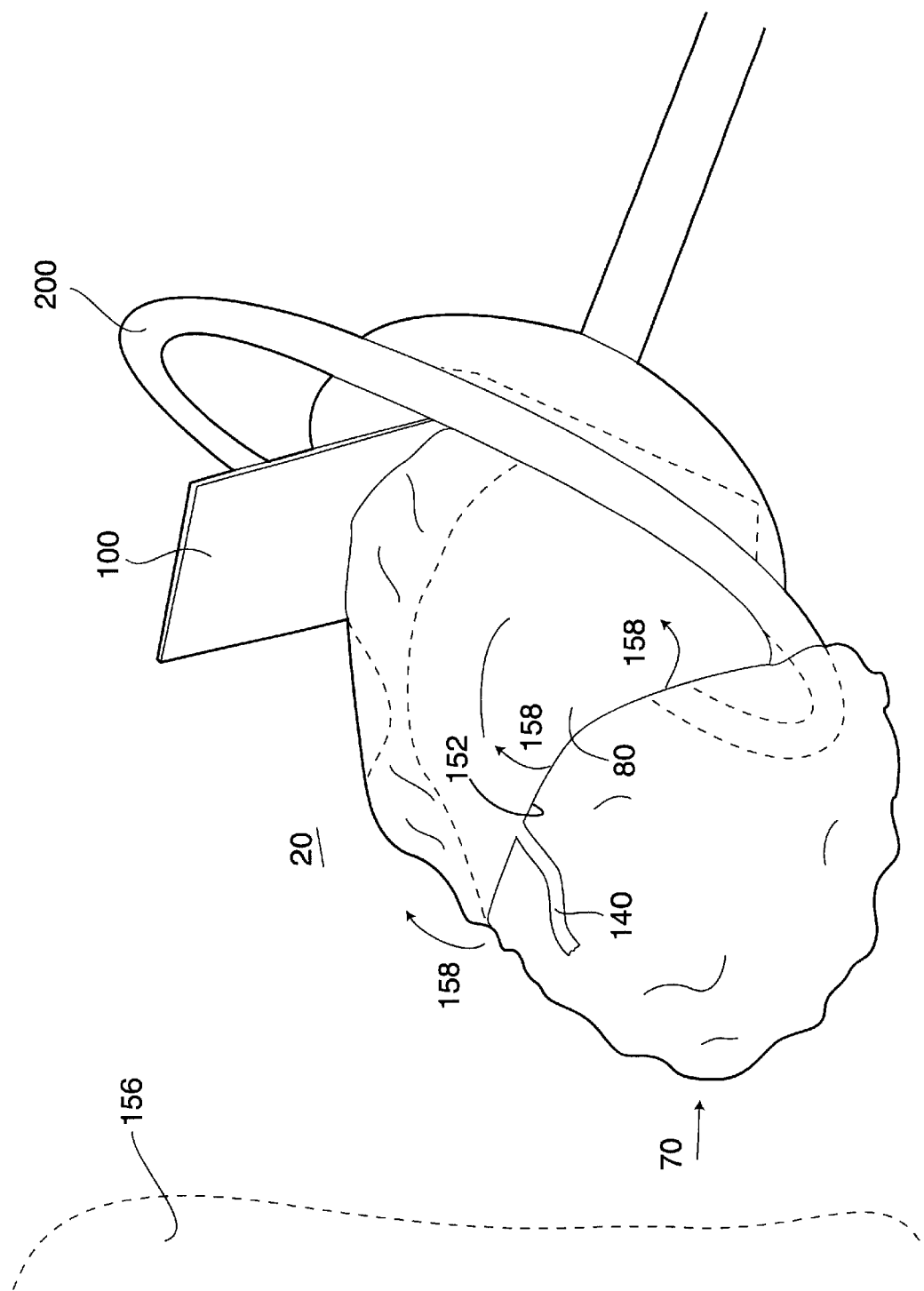
FIG. 8 illustrates the air bag breaking free of a cover and shroud.

Reference is made to FIG. 8. These figures show the bag pack 70a and the location of the cover 90, in dotted line, in relation to the shroud 80. More particularly the shroud 80 is shown in a simulated position resembling the configuration it would attain during the initial moments of inflation. As can be seen the shroud 80 envelops a volume considerably larger than that of the folded air bag. Additionally, the extended shroud extends significantly above the orientation of the folded air bag and cover 90. This upward extension of the shroud extends significantly above the plane of the top of the cover 90. As can be appreciated, even though the inflating air bag is still restrained by the shroud 80, the permitted outward movement (in the direction of the occupant) is adequate to cause the tear seam 98 to be ruptured to provide an opening for the deploying air bag.

During the initial moments of air bag inflation, the wrap 75 (shown in FIG. 1) is placed in tension (by the inflating air bag) and breaks. Continued inflation of the air bag expands the shroud from its folded, pre-inflation condition to an expanded condition (shown in FIGS. 6 and 7) in which the shroud is also placed under tension by the inflating air bag, and expanded to rupture the tear seam(s) of the cover 90.

One purpose of the shroud 80, as mentioned above, is to change the inflation kinematics of the air bag. More particularly, the shroud 80 controls the direction of the inflating air bag 70 and initially directs it at a downward angle, relative to the seated occupant, to attempt to avoid contacting the relatively hard chest cavity during initial deployment. Reference is briefly made to the operation of a typical prior art driver side air bag module. As the air bag inflates, it also bears on its corresponding cover and breaks the associated tear seam, the cover opens and the air bag exits the cover typically directly at the seated occupant often resulting in a high level of body, head and neck acceleration. The prior art has also proposed methods of controlling the trajectory of the inflating air bag. More particularly, the prior art have secured tethers to the air bag to force it from raising as it inflates.

Returning to the present invention, as the air bag continues to inflate, the shroud 80 remains in tension and defines a tubular passage 150 through which the air bag extends. As can be appreciated, as long as the shroud 80 remains intact, the air bag will expand through the zone of least resistance, that is, through the open end or mouth 152 of the extended or tensioned shroud 80. As can be seen (see FIG. 6) the shroud defines a tubular passage 150 oriented at an angle relative to the hub or mounting surface 200 of the steering wheel. With continued inflation the air bag begins to extend out from the main body 120 of the shroud 80 and engages the arm or strap 140. The inflating air bag begins to place the arm 140 in tension. This tension generally holds the mouth 152 in place and prohibits the mouth of the shroud from opening further. At this moment, the energy of the inflating air bag 70 is still within the tubular passage 150 and momentarily restrained by the strap 140 (if used). Subsequently, as the air bag continues to inflate the strap or arm 140 severs. This condition is shown in FIG. 8 which diagrammatically shows the air bag deploying from the cover at a downward angle relative to the cover and to the seated occupant 156. With the strap broken, as a greater amount of the air bag exits the cover and shroud, the air bag will begin to inflate laterally about the open end or mouth 152 of the shroud and also significantly increase in volume. As the air bag continues to inflate it pushes the shroud back upon itself (see arrows 158) allowing the air bag to more aggressively inflate laterally as well as toward the occupant.

In view of the above, it can be appreciated that during the initial moments of inflation the shroud directs the air bag to deploy in a relatively low trajectory to avoid the direct impact with the upper portion of the occupant's chest as well as the occupant's head. As the air bag continues to inflate and a larger portion of the air bag exits the mouth of the shroud, the air bag is free to fill laterally and upwardly, relative to the shroud, lessening the impact with the occupant.

Figure 6:
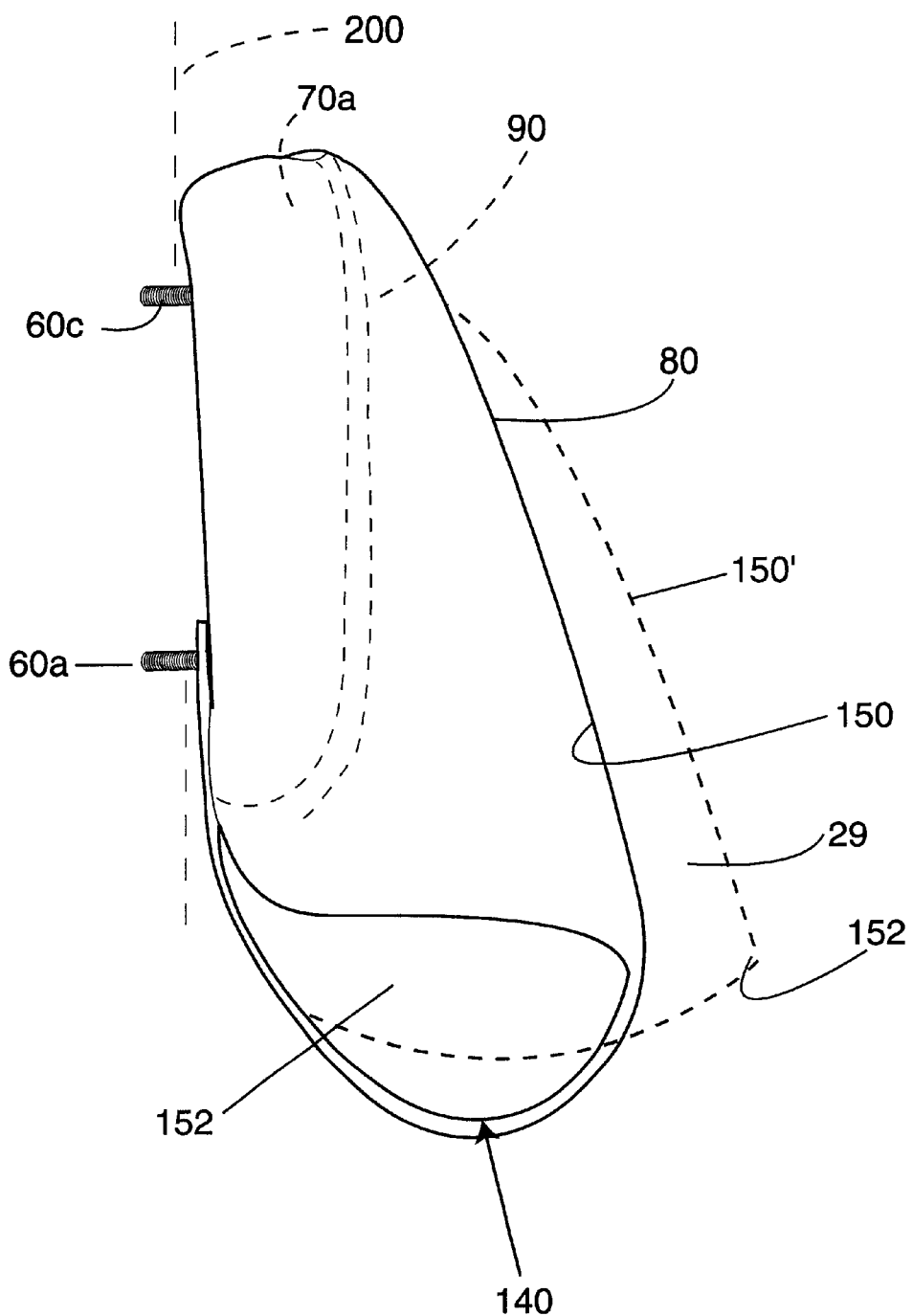
FIG. 6 is a side view of the shroud showing it in an extended configuration.
Figure 7:
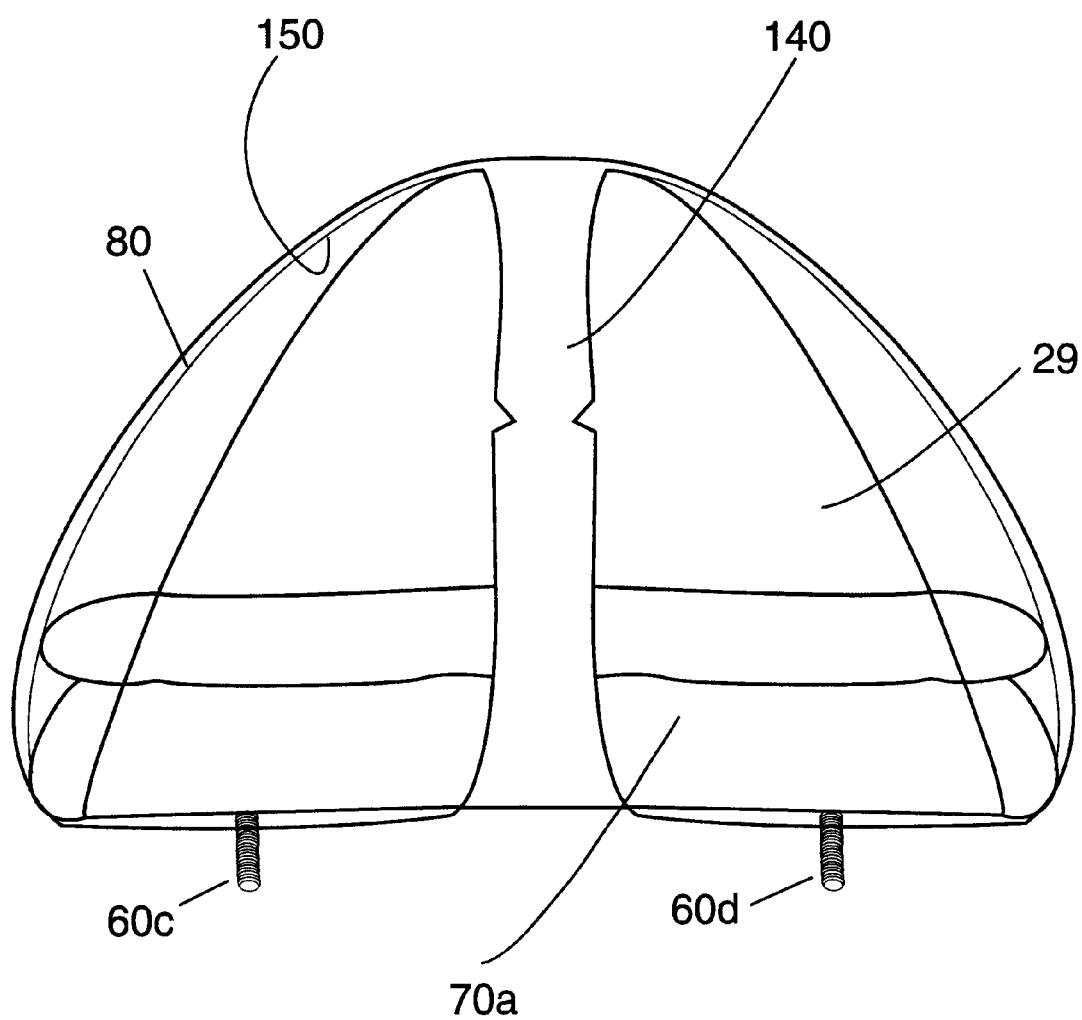
FIG. 7 is a front view of the shroud of FIG. 6.

Reference is briefly made to FIG. 6. As can be seen from FIG. 6 the angle at which the air bag leaves the cover is defined by the angle the shroud 80 makes with the cover (or steering wheel mounting surface). This angle is in part defined by the size of the shroud. As can be appreciated a smaller deployment angle can be achieved using a smaller sized shroud and a larger angle achieved with a shroud that is more oversized (see for example 150' showing a larger passageway of a larger shroud).

Reference is again made to the interaction of the air bag with the strap 140. From the above, the purpose of the strap 140 is to prevent the mouth of the shroud from opening thereby delaying the time at which the air bag can inflate laterally and upwardly. In certain applications this inherent delay is not necessary and as such, the strap 14 can be eliminated. In this case, the mouth of the shroud would terminate at the dotted line 136.

Figure 9:
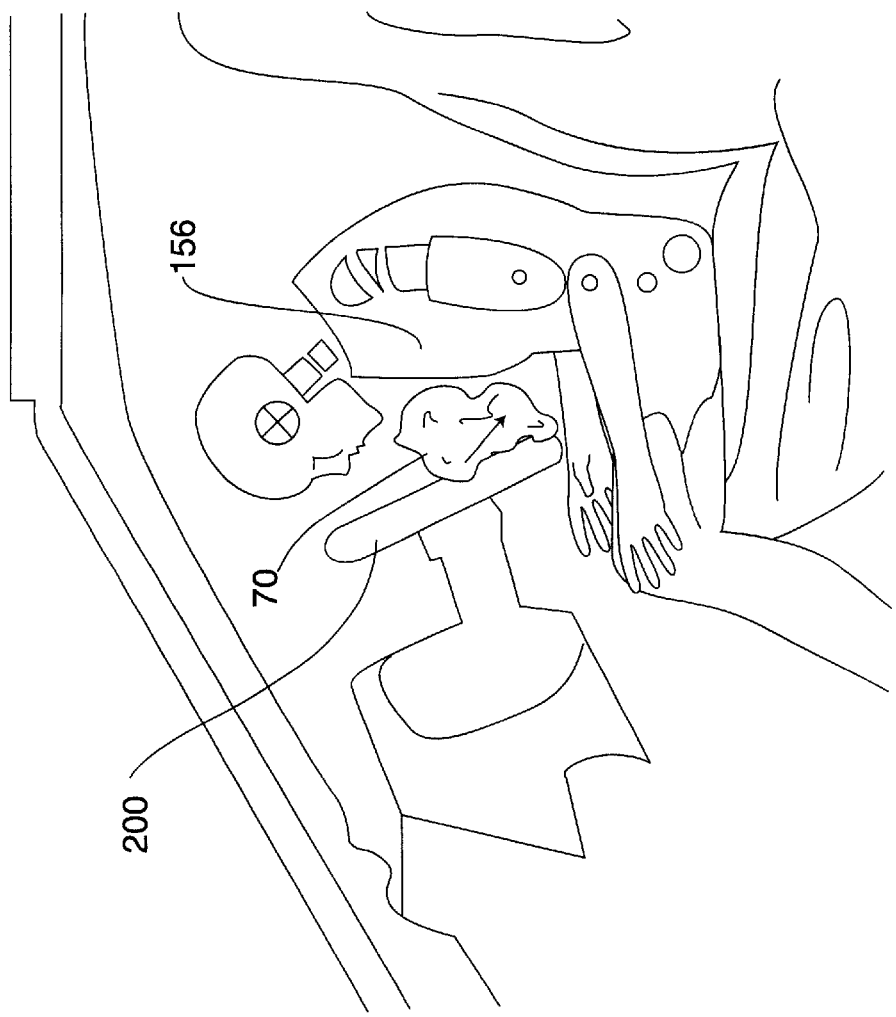
FIGS. 9 and 10 illustrate the performance of the present invention during a test.
Figure 10:
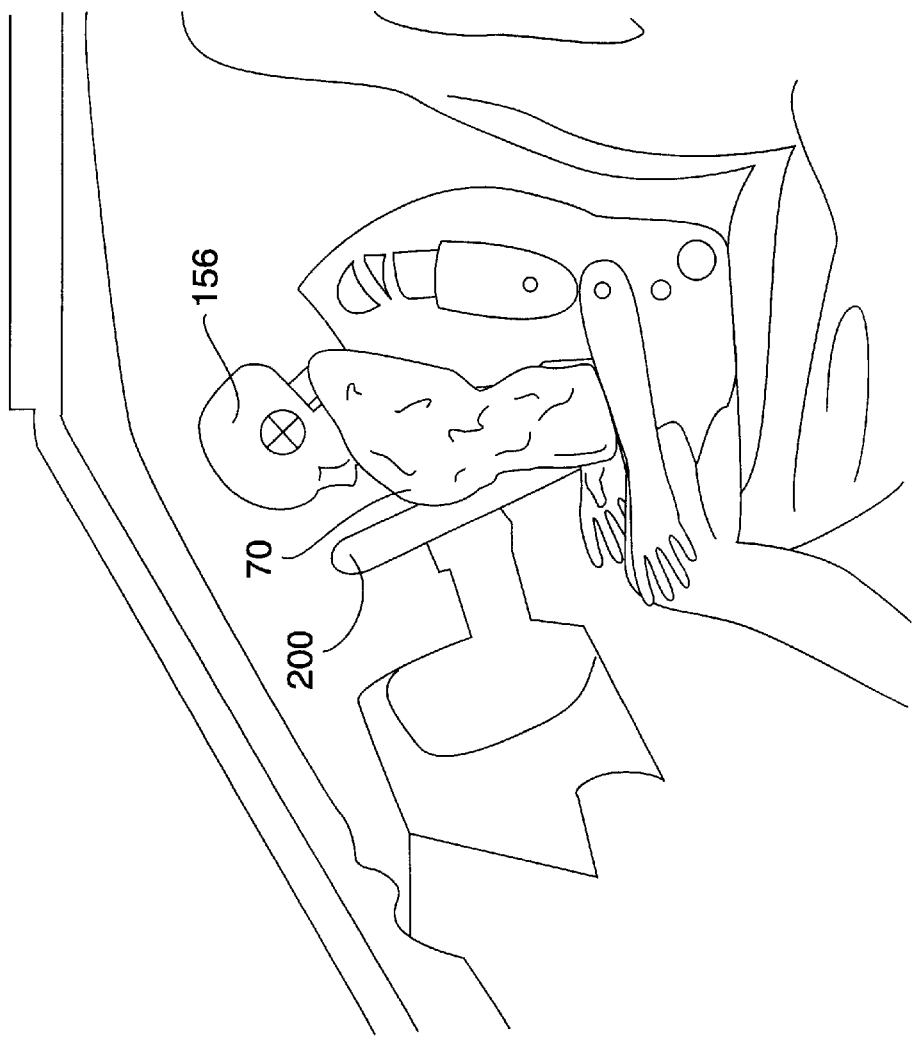

FIGS. 9 and 10 show the operation of the present invention. These figures are sketches made from digital photographs of a system test. FIG. 9 is a side view showing the air bag 70 expanding toward the seated occupant after the air bag has broken through the cover 90, expands the shroud 80 and is redirected by the intervention of the shroud (the cover 90 and shroud 80 are not shown in FIG. 9) with a downward trajectory relative to the seated occupant (test dummy) 156 several milliseconds after the initiation of the deployment of the inflator 50. The air bag has begun to inflate and move outwardly from the steering wheel. As can be appreciated, during the initial stage of air bag inflation, the forward motion of the air bag is restrained by the shroud 80. The inflating air bag has begun to inflate out of the open end or mouth 152, has broken the strap 140 and is proceeding toward the occupant. As a greater amount of the inflating air bag extends from the shroud 80 (see FIG. 10), the air bag begins to urge the shroud away from the occupant (not visible in FIG. 10), and the air bag begins to inflate laterally and upward to envelop the occupant.

Figure 11:
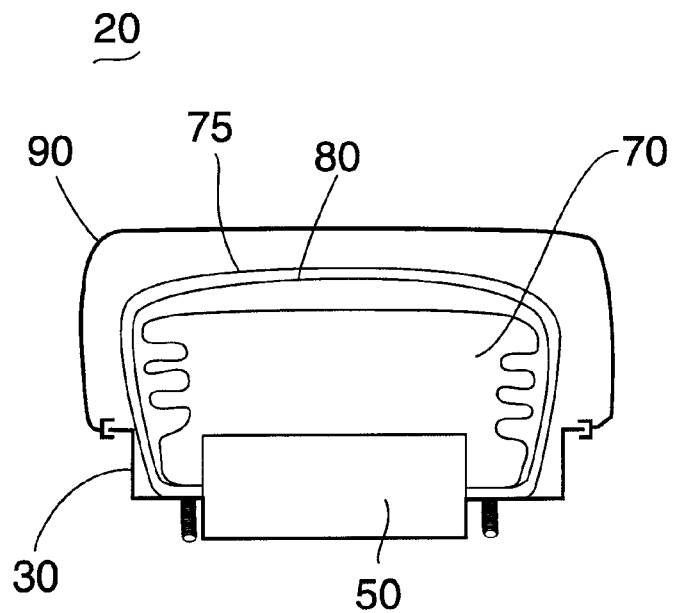
FIGS. 11 and 12 diagrammatically show the components of an assembled air bag module.
Figure 12:
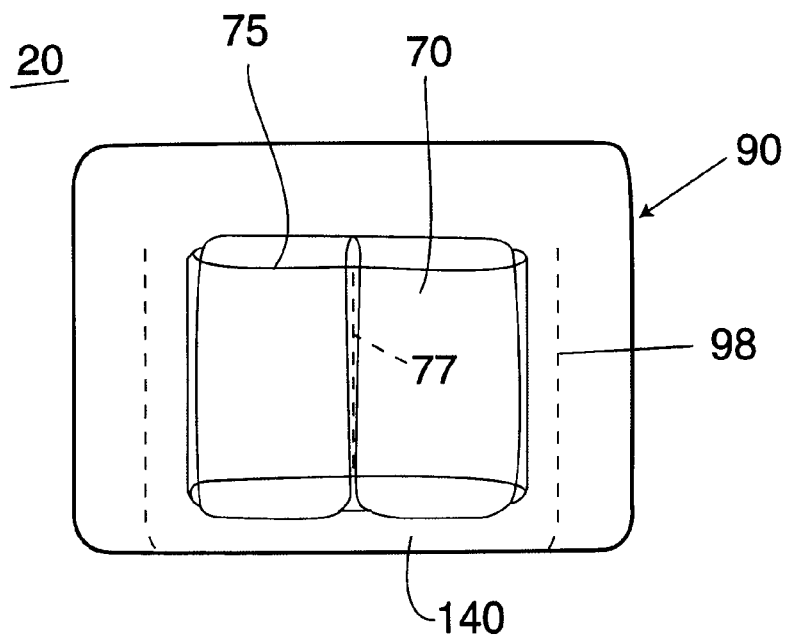

Reference is briefly made to FIGS. 11 and 12 which diagrammatically show the assembled module 20. As can be seen the air bag 70 is folded about the inflator 50, the shroud 80 is about the air bag 70 and the wrap 75 is about the shroud 80 to maintain the shroud and air bag in their pre-inflation state. The cover 90 is also shown secured to the housing 30.

Figure 13:
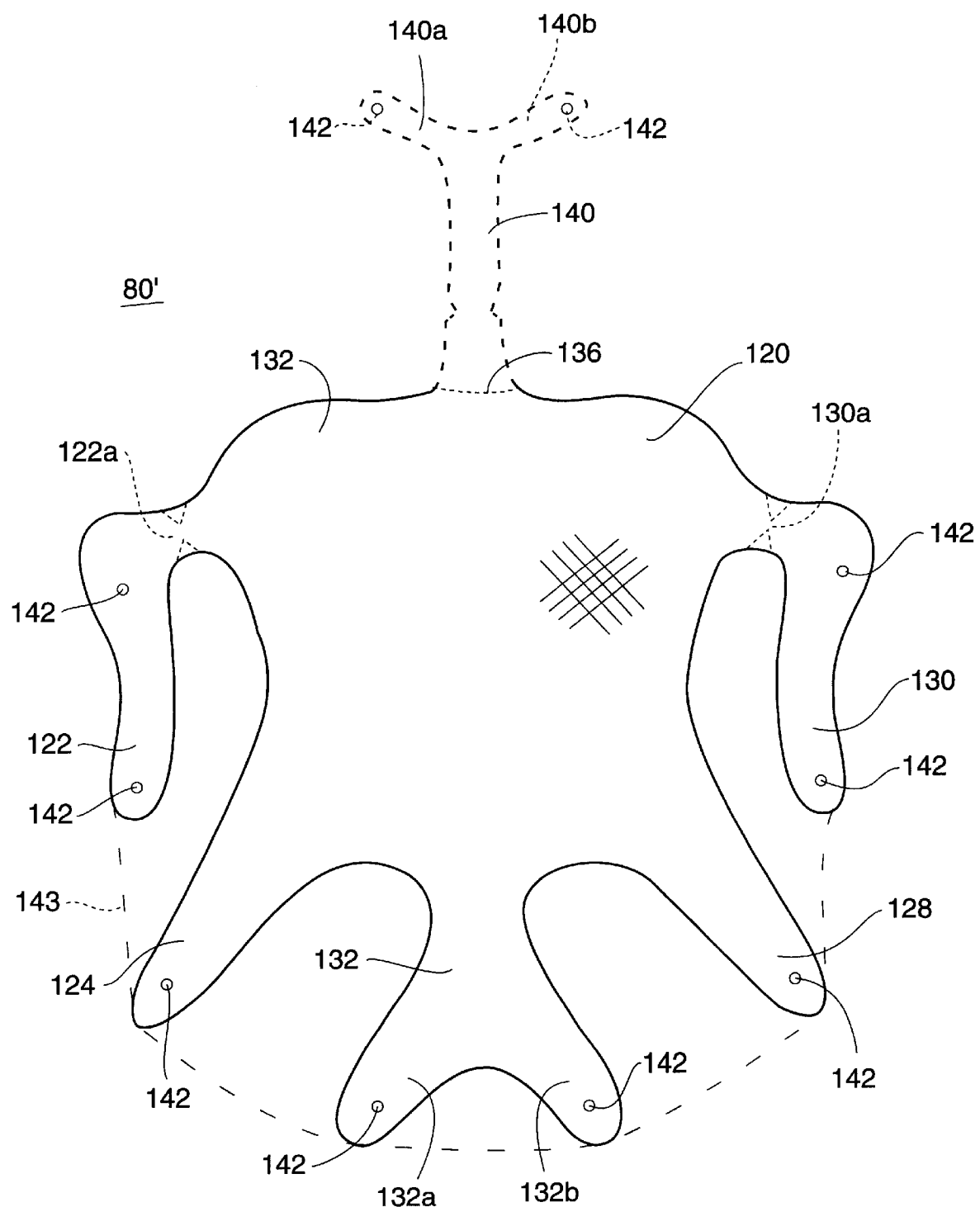
FIGS. 13–15 show an alternate embodiment of the invention.
Figure 14:
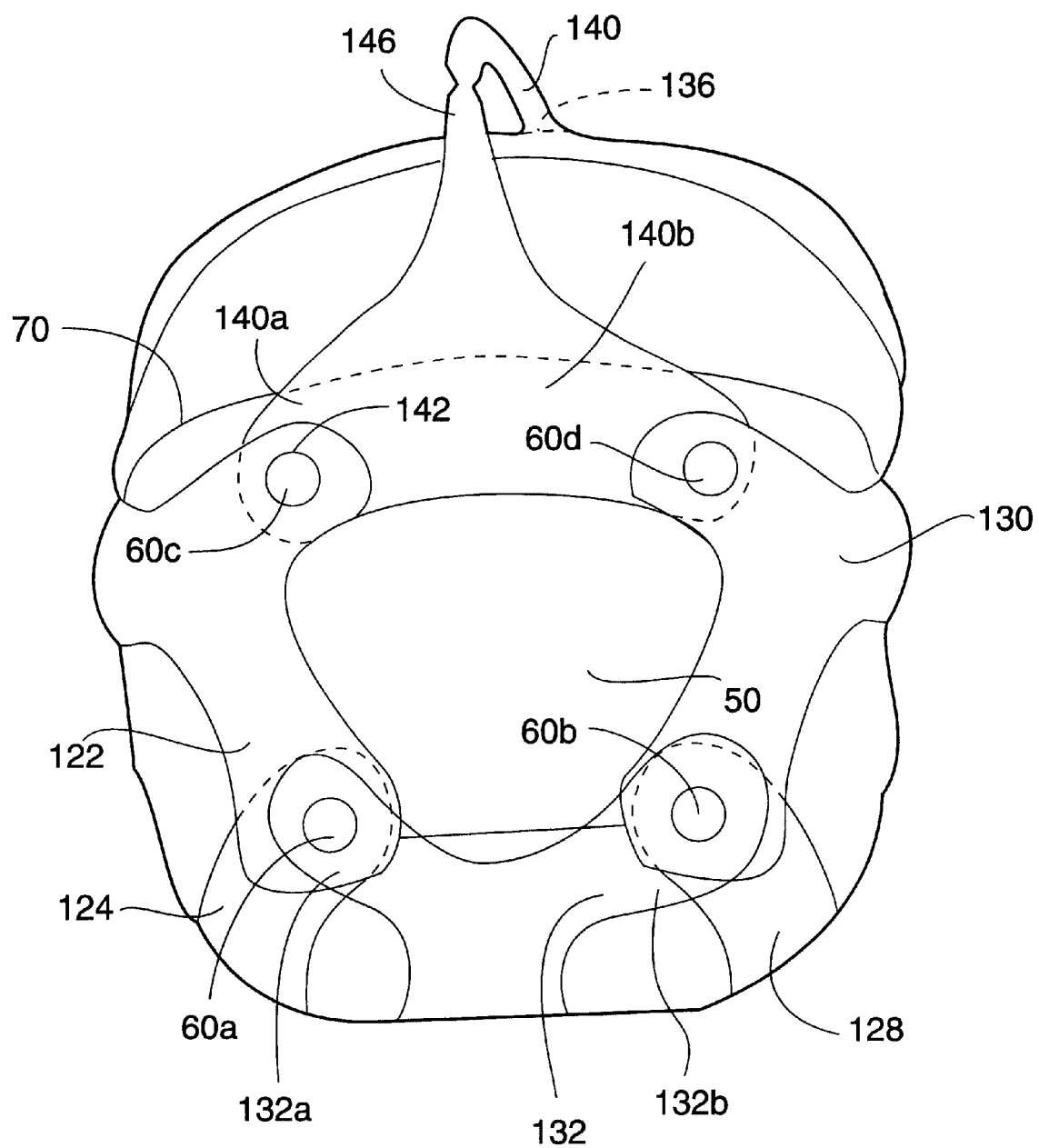
Figure 15:
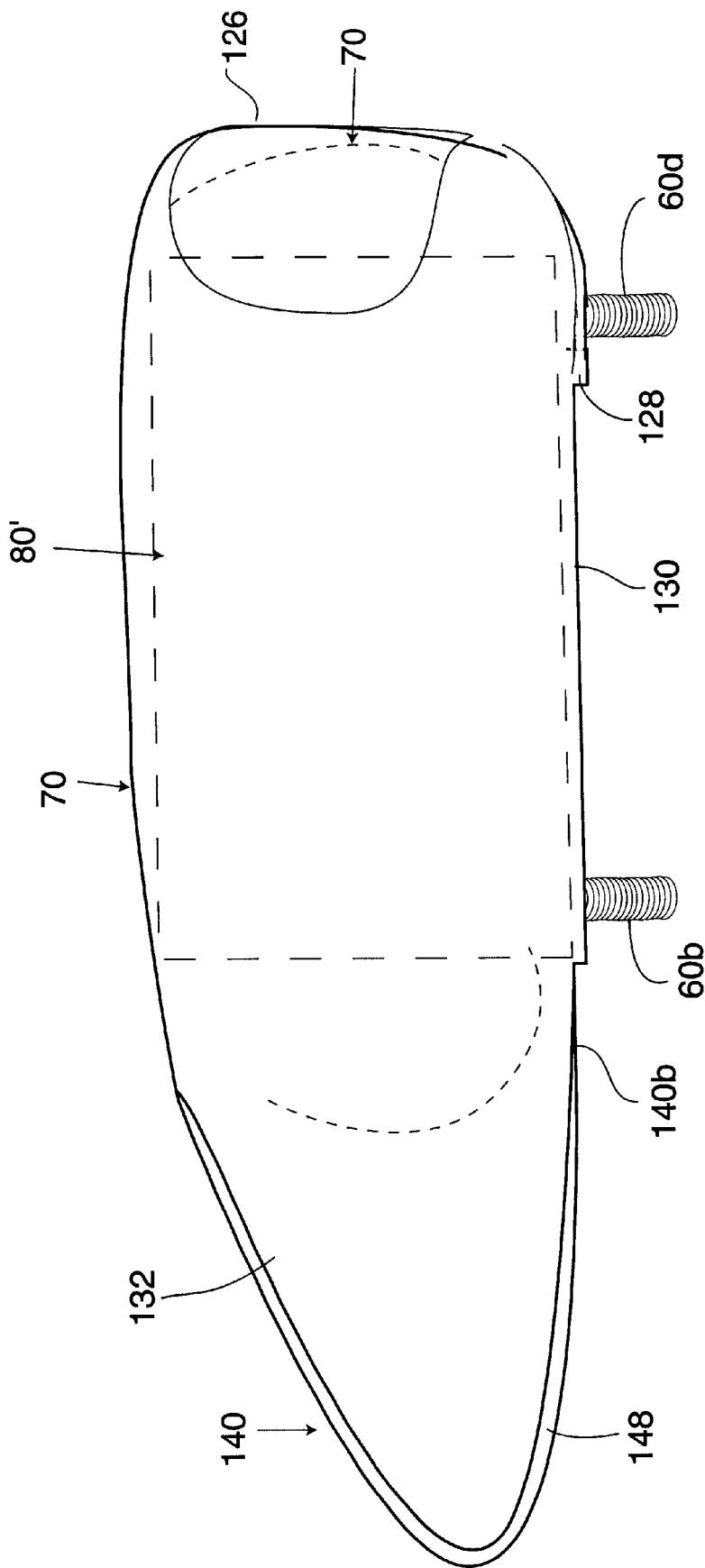

FIG. 13 shows an alternate shroud 80' which has a slightly different layout than shroud 80. Shroud 80' is substantially similar to shroud 80. Shroud 80' also includes arms 122 and 130 but these arms extend generally parallel to the main body 120. The corresponding arms of shroud 80 extended generally tangentially away from the top of the main body 120. The arms 122 and 130 of shroud 80' also include two mounting holes 142 permitting these straps to be connected to two of the four fasteners 60a–d rather than a single fastener as is the case with shroud 80. As can be appreciated, the medial straps 124 and 128 extend radially from the main body and include a single mounting hole 142. FIG. 13 shows the profile of a further embodiment of shroud 80' made without extending arms or straps. As can be seen the shroud 80' is a simple one-piece construction with various mounting holes 142. Numeral 143 is directed to a phantom line showing the periphery of this embodiment. When this alternate shroud is folded about the fasteners, the resulting configuration is somewhat more bulky because of the extra material that has not been cut away as compared to a shroud with distinct arms or straps. FIG. 14 is a bottom view of the shroud 80' wrapped about the folded air bag 70 and inflator 50 and in general resembles FIG. 4. FIG. 15 is a side plan view of the shroud 80' wrapped about the folded air bag. Shroud 80' can be oversized relative to the folded air bag as is the case with shroud 80 or it can be tightly wrapped about the air bag (as is the case with shroud 80 as well). Were shroud 80' oversized, it would permit the air bag to expand and break through the cover as mentioned above in relation to shroud 80. On the other hand, if shroud 80' is tightly wrapped about the air bag, provisions must be added to the shroud to permit its outward expansion to break the tear seam(s) of the cover 90 while still constraining the air bag to deploy through the passageway 150 formed by the shroud. One alternative that will permit the air bag and shroud to expand outwardly is to make the shroud 80' (or 80) from a resilient material. As the air bag expands, the resilient shroud is ballooned outwardly rupturing the cover. This construction will still define a passageway to redirect the inflation trajectory of the inflating air bag. This resilient shroud can include the tearable arm or strap 140 or such strap can be eliminated.

The arm 140 can be of integral construction (using the resilient material) or alternatively the arm or strap 140 can be a different material, such as the woven material used in the embodiments above. This type of construction will enable the strap to tear more readily if highly resilient material is used for the other portion of the shroud. In the above-described embodiments, the only strap of the shroud that was designed to break was strap 140. Various other straps such as straps 122 and 130 or 126 and 128 can also include a stress riser allowing them to break as the air bag deploys. For example, the arms 122 and 130 may include stress risers 122a and 130a as shown in dotted line. This construction would permit the air bag to break the forward portions (generally about the mouth 152) of the shroud freeing the air bag to expand sufficiently to rupture the cover tear seam 98. The rearward portion of the shroud which remains intact, would still provide a tubular passageway, albeit somewhat shorter, to control the inflation of the air bag in the desired direction.

Many changes and modifications in the above-described embodiment of the invention can of course be carried out without departing from the scope thereof. Accordingly, that scope is intended to be limited only by the scope of the appended claims.

What is claimed is:

1. A vehicle occupant safety device comprising:
   an air bag initially in a folded configuration and when inflated by inflated gases, expanding to an inflating configuration to protect the occupant;
   an inflator providing inflation gases to inflate the air bag;
   an external shroud substantially about the exterior of the folded air bag comprising four generally straight sides forming a first and second pair of corners, a mouth being defined by the generally straight side between the second pair of corners;
   a first pair of bands disposed near said first pair of corners;
   a second pair of bands disposed near the second pair of corners; and
   a housing.

2. The device of claim 1 wherein the shroud further contains a third mounting strap disposed on said mouth between the second pair of corners and connected to the housing.

3. The device of claim 2 wherein the third mounting strap is a frangible band disposed between the first pair of corners.

4. The device of claim 2 wherein the shroud is a single piece of material.

5. The device as defined in claim 2 wherein the shroud is sized to define a cavity whose volume is larger than the folded air bag to enable the air bag to expand forwardly a small distance and thereafter to expand laterally out from the shroud.

6. The device as defined in claim 4 wherein the frangible band has a first and second end, the first end being coupled to the mouth, the second end being mounted to the housing via mounting studs.

7. The device as defined in claim 6 wherein the first pair of bands have a narrowed portion formed by an angled notch.

8. The device as defined in claim 2 wherein the first pair of bands are generally serpentine in shape.

9. The device as defined in claim 2 wherein the first and second pairs of bands are mounted to the housing.

10. The device as defined in claim 2 wherein the housing supports the inflator, air bag and a cover.

11. A vehicle occupant safety device comprising:
    an air bag initially in a folded configuration and when inflated by inflation gases expands into an inflated configuration to protect an occupant;
    an inflator for providing inflation gases to inflate the air bag;
    an external shroud having a mouth substantially about an exterior surface of the inflated air bag for initially retarding the motion of the inflating air bag toward the occupant and for permitting the inflated air bag to inflate generally sideways adjacent the mouth, away from the occupant, while its forward motion is retarded, and wherein the shroud defines a cavity whose volume is larger than that of the folded air bag to provide a substantially open sided cover to permit the air bag to expand laterally outwardly;
    a cover which defines a cavity enclosing the air bag
    wherein the external shroud is generally square shaped having first and second pairs of corners, and first and second pairs of straps, each strap having a first and second end, the first end of the first pair of straps being coupled to the first pair of corners, the second end of the first pair of straps having a mounting location defining a hole; and
    a frangible band having a first and second end, the first end being mounted to the shroud between the first pair of corners, the second end of the frangible band having a mounting portion defining a hole.

12. The device of claim 11 having a mouth disposed between the first pair of corners.

13. The device of claim 12 wherein the cavity has a volume larger than the volume of the fold air bag.

14. A driver side air bag module for protecting an occupant of a vehicle comprising:
    cushion pack assembly, comprising:
    housing, mountable to a steering wheel of the vehicle; and
    an air bag positioned relative to the housing, the air bag initially folded into a compact configuration and upon receipt of inflation gas expands outwardly;
    flow directing passageway means for controlling the angle, relative to the mounted housing and the occupant, at which the air bag initially inflates wherein the passageway means comprises an oversized, flexible energy absorbing hood initially positioned about the folded air bag, the hood including a flexible shroud baffle portion having an open end and at least one breakable strap means for delaying the egress of the air bag from the shroud.

* * * * *